April 28, 1964 — R. P. BURR — 3,131,339
POSITION SENSING APPARATUS
Filed March 16, 1961 — 3 Sheets-Sheet 1
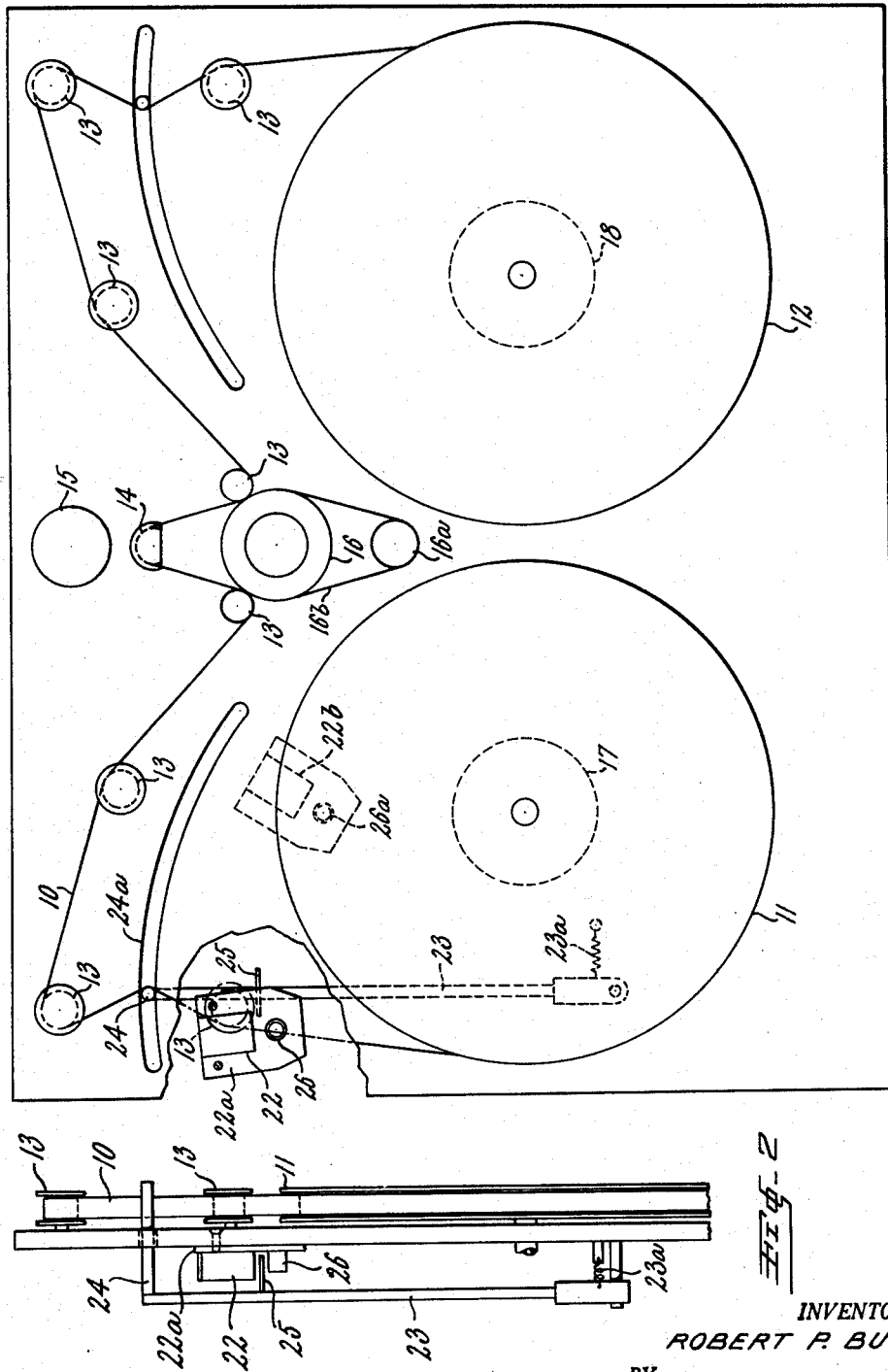
INVENTOR.
ROBERT P. BURR
BY Charles A. Blank
ATTORNEY

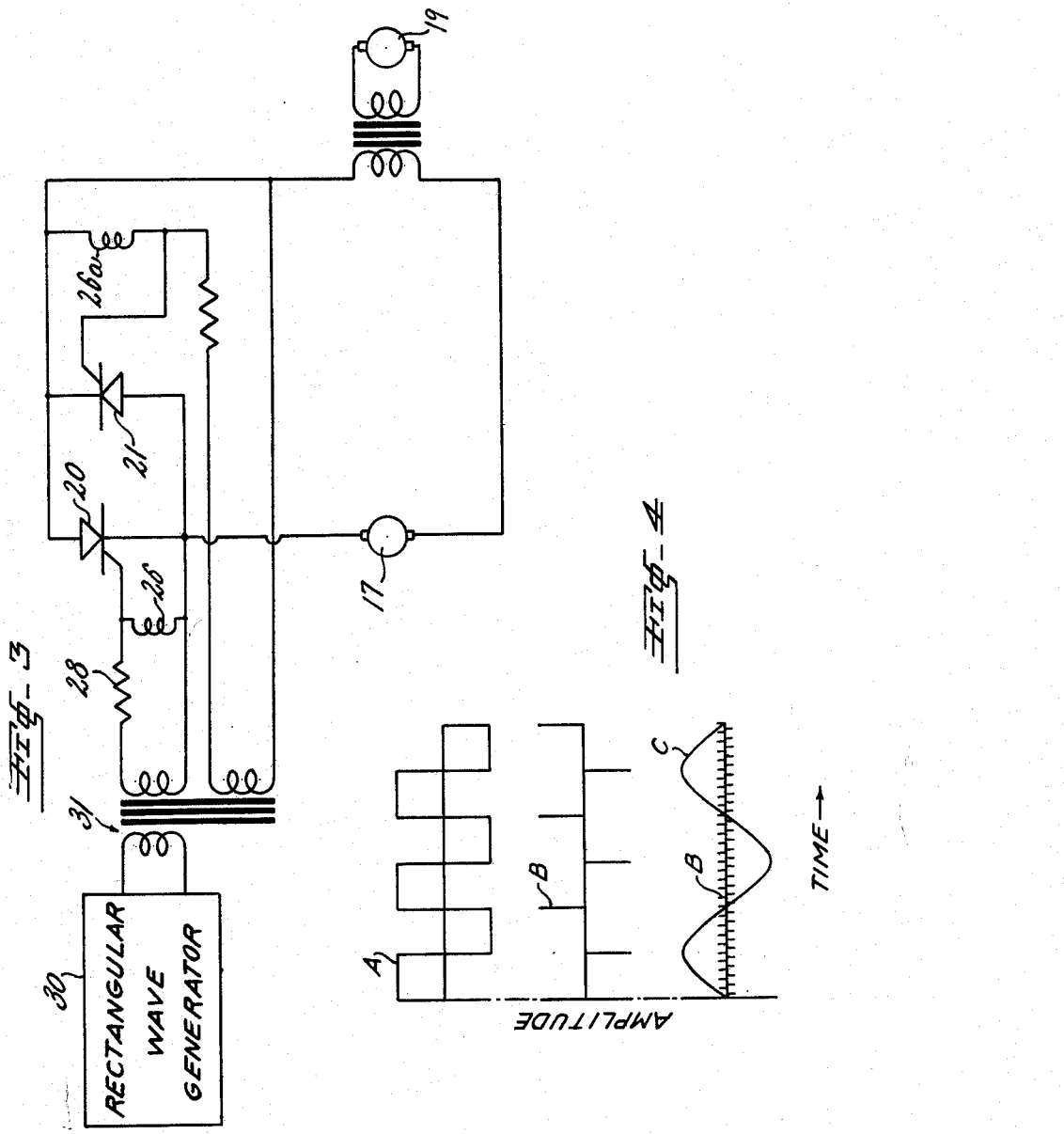

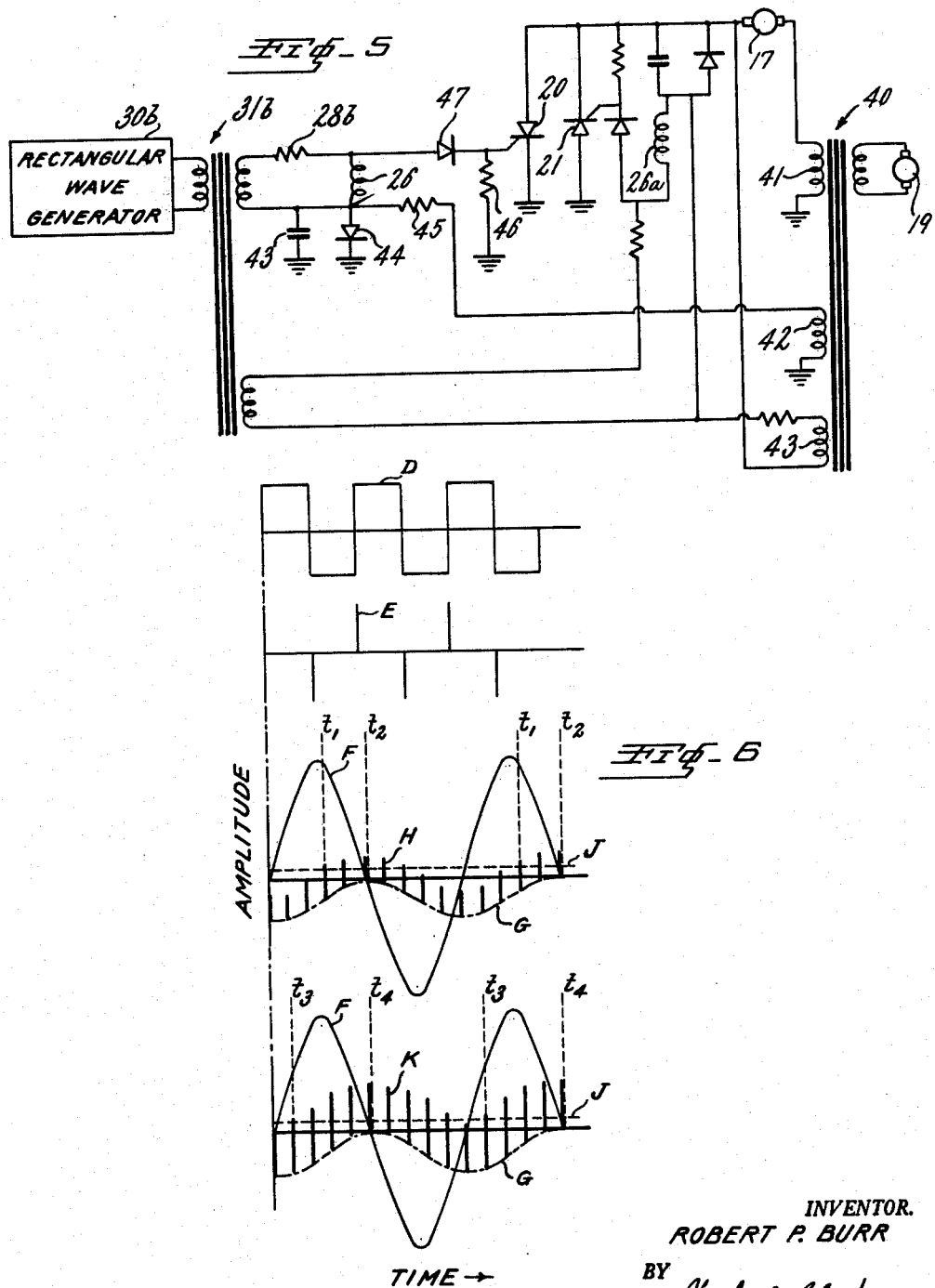

United States Patent Office 3,131,339
Patented Apr. 28, 1964

3,131,339
POSITION SENSING APPARATUS
Robert P. Burr, Lloyd Harbor, Huntington, N.Y., assignor to Circuit Research Company, Glen Cove, N.Y., a partnership
Filed Mar. 16, 1961, Ser. No. 96,194
12 Claims. (Cl. 318—6)

This invention relates to apparatus for sensing the positions of displaceable members and, more particularly, to servomechanisms for controlling the tape feed mechanisms of tape readers and recorders.

This application is a continuation-in-part of my co-pending application, Serial No. 79,623, filed December 30, 1960, entitled "Sensing Apparatus."

In magnetic tape reader and recorders, mechanical limit switches have heretofore been utilized to control the operation of the tape feed mechanisms. Such limit switches have moving parts which are mechanically actuated and easily wear out.

It is an object of the present invention, therefore, to provide a new and improved apparatus for sensing the position of a displaceable member.

It is another object of the invention to provide a new and improved servomechanism of simple and inexpensive construction for controlling the tape feed mechanism of tape translating apparatus.

It is another object of the invention to provide a new and improved servomechanism having a long life for controlling the tape feed mechanism of a tape reader.

It is another object of the invention to provide a new and improved servomechanism for providing a gradual, smoothly operating control of the position of a displaceable member.

In accordance with the invention, apparatus for sensing the position of a displaceable member comprises means for supplying a control signal and a saturable reactor responsive to the control signal for deriving control pulses therefrom. The apparatus also includes means located near the saturable reactor for developing a magnetic field to saturate the reactor to prevent the derivation of the control pulses when the member is in one operating position. The servomechanism also includes magnetic shield means positioned by the member for attenuating the magnetic field in the region of said reactor when the member is in another operating position, whereby the control pulses represent the position of the displaceable member.

For a better understanding of the present invention, together with other and further objects thereof, reference is made to the following description taken in connection with the accompanying drawings, and its scope will be pointed out in the appended claims.

Referring now to the drawings:

FIG. 1 is a fragmentary front view of a tape reader panel having mounted thereon members of a servomechanism constructed in accordance with the invention;

FIG. 2 is a side view of members of the servomechanism;

FIG. 3 is a schematic circuit diagram of electrical apparatus of the servomechanism;

FIG. 4 is a graph representing electrical signals to aid in explaining the operation of the FIG. 3 apparatus;

FIG. 5 is a schematic circuit diagram of electrical apparatus of a servomechanism constructed in accordance with a modified form of the invention, and FIG. 6 is a graph representing electrical signals to aid in explaining the operation of the FIG. 5 apparatus.

Referring now more particularly to FIG. 1 of the drawings, a perforated tape 10 is fed from a supply reel 11 to a take-up reel 12 across a series of rollers and guides 13. The tape passes over a pick-up plate 14 under a suitable light source 15 and is driven by a roller 16 in steps, under the control of a suitable stepping motor, as described more fully in co-pending application entitled Electro-Optical System, Serial No. 12,411, filed March 2, 1960 by Burr and Keogh. The drive shaft 16a of the stepping motor is connected by a suitable belt 16b to the roller 16.

The tape-feed and supply rollers 11, 12 are driven by suitable direct-current motors 17, 18 under the control of a pair of servomechanisms constructed in accordance with the invention. Each servomechanism includes circuit means for energizing the motor including means for supplying a control signal and a saturable reactor responsive to the control signal for deriving therefrom pulses to control the motor energization. The circuit means for energizing the motor 17 is represented in FIG. 3 and includes supply terminals coupled to an alternating-current 60-cycle source 19 and includes a pair of unidirectionally conductive devices 20, 21 coupled in series with the motor 17. The devices 20, 21 are solid state Thyratrons, for example, type C35F manufactured by General Electric. These Thyratron devices are non-conductive until the collector voltage becomes more positive than the emitter voltage and until the control electrode voltage is positive with respect to the emitter. The solid state device then conducts until the collector voltage becomes negative with respect to the emitter, regardless of the control electrode-emitter bias in the meanwhile.

The servomechanism controlling motor 17 also includes a magnet 22 located near saturable reactor 26 for developing a magnetic field to saturate the reactor to prevent the derivation of the control pulses when the motor 17 is in a given range of operating positions. The reactor 26 may be of conventional construction, such as a winding or a toroidal core of saturable ferromagnetic material. The reactor 26 and magnet 22 are attached to a suitable insulating board 22a mounted behind the front panel of the tape reader.

The servomechanism also includes magnetic shield means positioned by the tape 10 for attenuating the magnetic field in the region of the reactor 26 when the tape is outside the given range of operating positions to cause the derivation of the control pulses by the circuit means, whereby the motor is controlled to displace the tape into a desired operating range.

As represented in FIGS. 1 and 2, the magnetic shield means comprises a spring-loaded ferromagnetic rod 23 having a member 24 extending through slot 24a and over which the tape feeds. The rod 23 is positioned by the tape and has a ferromagnetic vane 25 for diverting the magnetic field away from the saturable reactor 26. A spring 23a attached to the front panel applies a clockwise force to the rod 23. The magnet 22 and saturable reactor 26 are positioned at one limit to the desired operating range of the rod 23 for controlling the energization of the motor 17 in a clockwise sense. There is also provided a magnet 22b and saturable reactor 26a positioned at the other limit to the desired operative range of the rod 23 for controlling the energization of the motor 17 in the counterclockwise sense, as will be more fully explained subsequently.

Considering now the operation of the servo-mechanism controlling motor 17, as the stepping motor drives the roller 16 in steps, the tape is drawn across the pick-up plate 14 and the code is read as described in the aforesaid copending application. While the tape is stepped forward in this manner, the tension on the tape increases and the rod 23 is displaced along the arc 24a in a counter-clockwise sense from a desired operating position between the saturable reactors 26, 26a toward the position represented in FIG. 1. As represented in FIG. 1, the vane 25 is about to enter the magnetic field between the magnet 22 and the reactor 26. While the rod 23 and vane 25 is in the desired operating range between the saturable reactors, the magnetic field of the magnet 22 is sufficient to saturate the reactor 26.

Referring to FIG. 3, an alternating-current signal having a frequency of, for example, 600 cycles per second is supplied from a rectangular wave generator 30 across a suitable transformer 31, as represented by Curve A of FIG. 4. Because the reactor 26 is saturated during this operating condition when the tape is in the desired operating range, the entire voltage drop of the secondary winding of the transformer is developed across resistor 28 and the saturated reactor appears as a short circuit which develops no output signal. The solid state device 20 is then zero-biased in a non-conductive state. Similarly, the solid state device 21 is non-conductive. Accordingly, no current flows through the motor 17 and the reel 11 does not rotate.

When the tension on the tape increases sufficiently to cause the vane 25 to enter the magnetic field from the magnet 22, it diverts the magnetic field sufficiently to cause the magnetization of the reactor to drop below the saturation level. In accordance with its substantially rectangular hysteresis loop, the reactor then presents an impedance to the signal represented by Curve A for a brief interval of time during each half cycle of that signal until saturation is effected by the current flow through the reactor during each half cycle. Thus, output pulses represented by Curve B are derived across the reactor. Accordingly, as represented by Curve B to a reduced time scale, positive pulses are applied to the control electrode of the solid state device 20 to drive the solid state device into conduction during alternate half cycles of the energizing current supplied by generator 19, represented by Curve C. Current flows through the motor 17 during these half cycles, causing the reel to rotate in a clockwise sense and feeding tape to the supply rollers. When this occurs, the spring-loaded rod 23 moves in a clockwise sense away from the magnet 22 and saturable reactor 26 into the desired range of operating positions. The reactor again becomes saturated continuously by the external magnetic field developed by magnet 22. Pulses then are no longer supplied to the solid state device 20 and the motor 17 is deenergized to stop the rotation of the reel 11.

If the slack on the tape becomes greater than desired, the rod 23 moves into the region between the magnet 22a and the reactor 26a which cooperate to drive the motor 17 in the counterclockwise sense to take up the slack. This is accomplished by rendering solid state device 21 of FIG. 3 conductive during the other half cycles of the signal represented by Curve C in a manner similar to that described in connection with the conduction of solid state device 20. A similar servomechanism is associated with the take-up reel for controlling the motor 18.

Referring now more particularly to FIG. 5 of the drawings, there is represented apparatus constructed in accordance with the invention for gradually displacing the tape into the desired range of operating positions. The apparatus includes solid state Thyratrons 20 and 21 and saturable reactors 26 and 26a which may be identical with the corresponding components of the FIG. 3 embodiment. The rectangular wave generator 30b, transformer 31b and resistor 28b are similar to corresponding components of the FIG. 3 apparatus.

The FIG. 5 apparatus includes circuit means for supplying a reference signal to provide a variable reference level for the control pulses derived across the saturable reactor to control the periods of conduction of the solid state devices 20, 21 to develop current flow through the solid state devices representative of the position of the tape. More particularly, this circuit means includes a transformer 40 having a plurality of secondary windings 41, 42, 43. The secondary windings 42 and 43 supply to the bias circuits of the solid state devices 20 and 21, respectively, alternating-current reference signals substantially quadrature-phase-displaced from the alternating current signal supplied to the solid state devices by the winding 41.

The signal developed across the winding 42 is in phase with the signal developed across the winding 41 and is translated through a phase-shifting network comprising condenser 43 and resistor 45 which delay the signal across the condenser 44 by 90°. The diode 44 serves as a clamp to maintain the positive peak of the phase-shifted signal at ground potential. Diode 47 and resistor 46 are utilized to eliminate negative peaks from the signal applied to the control electrode of the solid state device 20. The circuit controlling the solid state device 21 is of similar construction.

Considering now the operation of the FIG. 5 apparatus with reference to the graph of FIG. 6, the rectangular wave signal developed across the secondary winding of the transformer 31b is represented by Curve D and may have frequency of, for example, 600 cycles per second. Referring to FIG. 1, when the saturable reactor 26 is fully saturated while the tape is in the desired range of operating positions, no pulses are derived by the reactor, as previously explained.

If the tape gradually becomes slack, the vane 25 of FIG. 1 gradually moves into the region between the magnet 22 and the reactor 26 and the saturable reactor 26 gradually becomes unsaturated. Pulses are then derived by the saturable reactor 26 which gradually increase to maximum amplitude, represented by Curve E, occurring at maximum amplitude when the reactor is fully unsaturated.

Curve F represents the potential developed at the collector of the solid state device 20, having a frequency of, for example, 60 cycles per second. Broken-line Curve G represents the signal developed across the condenser 43 derived by the phase-shifting network 43, 44, 45 from the transformer winding 42. The pulses derived by the saturable reactor 26 when the vane begins to enter the region between the magnet 22 and the reactor 26 are additively combined with the signal represented by Curve G and are translated through the diode 47 to provide a resultant signal across the resistor 46 represented by the pulses of Curve H. The firing level of the solid state device 20 is represented by broken-line Curve J. Accordingly, during each positive half cycle of the signal represented by Curve F, at time $t_1$ one of the pulses of Curve H exceeds the cut-off level of the solid state device. The solid state device then conducts and remains conductive until the collector becomes negative at time $t_2$. Accordingly, the motor 17 is energized during the period $t_1$–$t_2$. Thus, the motor 17 rotates the reel 11 of FIG. 1 to displace the tape gradually toward the desired operating region.

If the tape nevertheless continues to become slack, causing the vane 25 to travel further into the region between the magnet 22 and the reactor 26, the amplitude of the pulses derived by the reactor 26 increases. The pulses developed across the resistor 46 then occur as represented by Curve K. Under this operating condition, the pulses of Curve K exceed the firing level J of the solid state device at time $t_3$ and the solid state device conducts during the interval $t_3$–$t_4$. The motor 17 is then energized during a greater portion of each cycle of the energizing signal and is effective to rotate the reel 11 more quickly to take up the slack of the tape.

As the vane 25 moves out of the region between the magnet 22 and the reactor 26, the amplitude of the pulses derived by the reactor 26 gradually decreases, causing energization of the motor 17 during a gradually decreasing portion of the cycle of the energizing signal. Accordingly, the FIG. 5 apparatus is effective gradually to reposition the tape into the desired operating range, thereby minimizing the possibility of hunting or overshooting of the servomechanism when a slight correction of the tape position is needed and providing a gradual, smoothly operating control of the tape position.

From the foregoing description, it will be apparent that a servomechanism constructed in accordance with the invention has no mechanically actuated limit switch components and utilizes only components having a long life. Moreover, the sensing apparatus may be utilized in applications where it is desired to indicate the position of a displaceable member without repositioning the member.

While there has been described what is at present believed to be the preferred embodiment of this invention, it will be obvious to those skilled in the art that various changes and modifications may be made therein without departing from the invention, and it is, therefore aimed to cover all such changes and modifications as fall within the true spirit and scope of the invention.

Having thus described my invention, what I claim and desire to protect by Letters Patent is:

1. Apparatus for sensing the position of a displaceable member comprising: means for supplying a control signal; a saturable reactor responsive to said control signal for deriving control pulses therefrom; means located near said saturable reactor for saturating said reactor to prevent the derivation of said control pulses when the member is in one operating position; and magnetic shield means positioned by the member for attenuating said magnetic field in the region of said reactor when the member is in another operating position, whereby the control pulses represent the position of the displaceable member.

2. A servomechanism for controlling the position of a displaceable member comprising: a motor for displacing the member; circuit means for energizing said motor including means for supplying a control signal and a saturable reactor responsive to said control signal for deriving therefrom pulses to control the motor energization; means located near said saturable reactor for saturating said reactor to prevent the derivation of said control pulses when the member is in one range of operating positions; and magnetic shield means positioned by the member for attenuating said magnetic field in the region of said reactor when the member is in another range of operating positions to cause the derivation of said control pulses by said circuit means, whereby the motor energization is controlled to displace the member into a desired range of operating positions.

3. A servomechanism for controlling the position of a displaceable member comprising: a direct-current motor for displacing the member; circuit means for energizing said motor including alternating-current signal supply terminals and a unidirectionally conductive device coupled in series with said motor and including means for supplying a control signal and a saturable reactor responsive to said control signal for deriving therefrom pulses to render said unidirectionally conductive device conductive during alternate half cycles of the alternating current signal to cause the motor to operate during said alternate half cycles; means located near said saturable reactor for developing a magnetic field to saturate said reactor to prevent the derivation of said control pulses when the member is in a desired range of operating positions; and magnetic shield means positioned by the member for attenuating said magnetic field in the region of said reactor when the member is outside said desired range of operating positions to cause the derivation of said control pulses by said circuit means, thereby causing said motor to displace the member into said desired range of operating positions.

4. A servomechanism for controlling the tape feed mechanism of a tape reader comprising: a motor for driving a tape reel; circuit means for energizing said motor including means for supplying a control signal and a saturable reactor responsive to said control signal for deriving therefrom pulses to control the motor energization; means located near said saturable reactor for developing a magnetic field to saturate said reactor to prevent the derivation of said control pulses when the tape is in a desired range of operating positions; and magnetic shield means positioned by the tape for attenuating said magnetic field in the region of said reactor when the tape is outside said desired range of operating positions to cause the derivation of said control pulses by said circuit means, thereby causing the motor to displace the tape into said desired range of operating positions.

5. A servomechanism for controlling the tape feed mechanism of a tape reader comprising: a motor for driving a tape reel; circuit means for energizing said motor including means for supplying a control signal and a saturable reactor responsive to said control signal for deriving therefrom pulses to control the motor energization; means located near said saturable reactor for developing a magnetic field to saturate said reactor to prevent the derivation of said control pulses when the member is in a desired range of operating positions; and a spring-loaded ferromagnetic rod having an extension over which the tape feeds and positioned by the tape and having a ferromagnetic vane for diverting said magnetic field away from said reactor when the tape is outside said desired range of operating positions to cause the derivation of said control pulses, thereby causing the motor to displace the tape into said desired operating range.

6. A servomechanism for controlling the tape feed mechanism of a tape reader comprising: a motor for driving a tape reel; circuit means for energizing said motor including means for supplying a control signal and saturable reactors responsive to said control signal for deriving therefrom pulses to control the motor energization; said saturable reactors being positioned at limits to a desired operating range of tape positions; means located near said saturable reactors for developing magnetic fields to saturate said reactors to prevent the derivation of said control pulses when the tape is in said desired range of operating positions; and magnetic shield means positioned by the tape for attenuating the magnetic field of either magnet in the region of the corresponding reactor when the tape is at either limit of said desired range of operating positions to cause the derivation of control pulses by said circuit means, thereby causing said motor to displace the tape into said desired range of operating positions.

7. A servomechanism for controlling the tape feed mechanism of a tape reader comprising: a direct-current motor for driving a tape reel; circuit means for energizing the motor including an alternating-current signal supply terminals and a unidirectionally conductive device coupled in series with said motor and including means for supplying a rectangular wave control signal and a saturable reactor responsive to said control signal for deriving therefom pulses to render said unidirectionally conductive device conductive during alternate half cycles of the alternating current signal to cause the motor to operate during said alternate half cycles; means located near said saturable reactor for developing a magnetic field to saturate said reactor to prevent the derivation of said control pulses when the tape is in a desired range of operating positions; and a spring-loaded ferromagnetic rod having an extension over which the tape feeds and positioned by the tape and having a ferromagnetic vane for diverting said magnetic field away from said reactor when the tape is outside said desired range of operating positions to cause the derivation of said control pulses, thereby causing the motor to displace the tape into said desired range of operating positions.

8. Apparatus for sensing the position of a displaceable member comprising: alternating-current signal supply terminals; a unidirectionally conductive device coupled thereto; means for supplying a control signal; a saturable reactor responsive to said control signal for deriving therefrom pulses to render said unidirectionally conductive device conductive during alternate half cycles of the alternating-current signal; means located near said saturable reactor for developing a magnetic field to saturate said reactor; means positioned by the member for attenuating said magnetic field in the region of said reactor when the member is in a given range of operating positions to cause the derivation by said reactor of control pulses having a variable amplitude representative of the position of the member; and circuit means for supplying a reference signal to provide a variable reference level for said control pulses to control the periods of conduction of said conductive device to develop a current flow representative of the position of the member.

9. Apparatus for sensing the position of a displaceable member comprising: terminals for supplying a first alternating current signal; a unidirectionally conductive device coupled thereto; means for supplying a control signal; a saturable reactor responsive to said control signal for deriving therefrom pulses to render said unidirectionally conductive device conductive during alternate half cycles of said alternating-current signal; means located near said saturable reactor for developing a magnetic field to saturate said reactor to prevent the derivation of said control pulses when the member is in one range of operating positions; magnetic shield means positioned by the member for attenuating said magnetic field in the region of said reactor when the member is in another range of operating positions to cause the derivation by said reactor of control pulses having a variable amplitude representative of the position of the member; circuit means for supplying an alternating current reference signal substantially quadrature-phase-displaced from said first alternating-current signal to provide a variable reference level for said control pulses and for adding said reference signal and said control pulses to control the periods of conduction of said conductive device to develop a current flow representative of the position of the member.

10. A servomechanism for controlling the position of a displaceable member comprising: a direct-current motor for displacing the member; circuit means for energizing said motor including alternating-current signal supply terminals and a unidirectionally conductive device coupled in series with said motor and including means for supplying a control signal and a saturable reactor responsive to said control signal for deriving therefrom pulses to render said unidirectionally conductive device conductive during alternate half cycles of the alternating current signal to cause the motor to operate during said alternate half-cycles; magnetic means located near said saturable reactor for saturating said reactor to prevent the derivation of said control pulses when the member is in one range of operating positions; magnetic shield means positioned by the member for attenuating said magnetic field in the region of said reactor when the member is in another range of operating positions to cause the derivation by said reactor of control pulses having a variable amplitude representative of the position of the member; circuit means for supplying a reference signal to provide a variable reference level for said control pulses to control the periods of conduction of said conductive device to develop a current flow representative of the position of the member, thereby causing said motor to displace the member into said one range of operating positions.

11. A servomechanism for controlling the tape feed mechanism of a tape reader comprising: a motor for driving a tape reel; circuit means for energizing said motor including alternating-current signal supply terminals and a unidirectionally conductive device coupled in series with said motor and including means for supplying a control signal and a saturable reactior responsive to said control signal for deriving therefrom pulses to render said unidirectionally conductive device conductive during alternate half cycles of the alternating current signal to cause the motor to operate during said alternate half cycles; magnetic means located near said saturable reactor for developing a magnetic field to saturate said reactor to prevent the derivation of said control pulses when the member is in one range of operating positions; and a spring-loaded ferromagnetic rod having an extension over which the tape feeds and positioned by the tape annd having a ferromagnetic vane for diverting said magnetic field away from said reactor when the tape is in another range of operating positions to cause the derivation of control pulses having a variable amplitude representative of the position of the tape; circuit means for supplying a reference signal to provide a variable reference level for said control pulses to control the periods of conduction of said conductive device to develop a current flow representative of the position of the tape, thereby causing the motor to displace the tape gradually into said one range of operating positions.

12. Apparatus for sensing the position of a displaceable member comprising: alternating-current signal supply terminals; a unidirectionally conductive device coupled thereto; means for supplying a control signal; a saturable reactor responsive to said control signal for deriving therefrom pulses to render said unidirectionally condutcive device conductive during alternate half cycles of the alternating-current signal; means for developing a magnetic field to saturate said reactor; displacement of said member causing attenuation of said magnetic field in the region of said reactor when said member is in a given range of operating positions and causing the derivation by said reactor of control pulses having a variable amplitude representative of the position of said member; and circuit means for supplying a reference signal to provide a variable reference level for said control pulses to control the periods of conduction of said conductive device to develop a current flow representative of the position of said member.

References Cited in the file of this patent
UNITED STATES PATENTS 2,592,088   Wannamaker et al. _____ Apr. 8, 1952

OTHER REFERENCES

Controlled Rectifiers Drive A.C. and D.C. Motors, by W. R. Seegmiller, pages 73–75 of Electronics, November 13, 1959.